(12) United States Patent
Waaramaa

(10) Patent No.: US 10,093,409 B2
(45) Date of Patent: Oct. 9, 2018

(54) ELECTROMECHANICAL DECOUPLER

(71) Applicant: The Boeing Company, Chicago, IL (US)

(72) Inventor: Todd Waaramaa, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 406 days.

(21) Appl. No.: 15/156,696

(22) Filed: May 17, 2016

(65) Prior Publication Data

US 2017/0334551 A1 Nov. 23, 2017

(51) Int. Cl.
*F16D 27/09* (2006.01)
*F16D 23/12* (2006.01)
*B64C 13/50* (2006.01)
*B64C 13/28* (2006.01)
*B64C 27/56* (2006.01)
*B64C 13/04* (2006.01)

(52) U.S. Cl.
CPC ............. *B64C 13/50* (2013.01); *B64C 13/04* (2013.01); *B64C 13/28* (2013.01); *B64C 27/56* (2013.01); *F16D 27/09* (2013.01); *F16D 23/12* (2013.01)

(58) Field of Classification Search
CPC ......... B64C 13/50; B64C 13/04; B64C 13/28; B64C 27/56; F16D 27/09; F16D 23/12
See application file for complete search history.

(56) References Cited

U.S. PATENT DOCUMENTS

| | | | | |
|---|---|---|---|---|
| 5,465,819 A | * | 11/1995 | Weilant | B60K 17/20 192/35 |
| 5,820,071 A | | 10/1998 | Cross | |
| 7,007,897 B2 | * | 3/2006 | Wingett | B64C 13/42 244/227 |
| 7,243,769 B2 | * | 7/2007 | Voelkert | F16D 27/06 192/48.2 |
| 9,284,996 B2 | | 3/2016 | Kruk et al. | |
| 9,643,717 B2 | * | 5/2017 | Grohmann | B64C 13/50 |

FOREIGN PATENT DOCUMENTS

| | | |
|---|---|---|
| FR | 3025493 | 3/2014 |
| JP | 56020839 | 2/1981 |

OTHER PUBLICATIONS

European Search Report dated Aug. 11, 2017 from co-pending European patent Application No. 17171080.9.

* cited by examiner

*Primary Examiner* — Jacob S. Scott
*Assistant Examiner* — Tinh Dang
(74) *Attorney, Agent, or Firm* — Joseph M. Rolnicki; Evans & Dixon, L.L.C.

(57) ABSTRACT

A compact electromechanical decoupler device is operatively connected between a manual control device of an aircraft and an electromechanical actuator that controls the flight modes of the aircraft. The electromechanical decoupler device is operable to decouple the operative connection between the manual control device and the electromechanical actuator with the absence of power supplied to the electromechanical decoupler device. The electromechanical decoupler device can recouple the operative connection between the manual control device and the electromechanical actuator on resupply of power to the electromechanical decoupler device and on manually achieving proper rotational alignment or indexing between the mechanical control device and the electromechanical actuator.

20 Claims, 10 Drawing Sheets

ELECTROMECHANICAL DECOUPLER

FIELD

This disclosure pertains to a compact electromechanical device that is operatively connected between a manual control device of an aircraft and an actuator that controls the flight modes of the aircraft. The electromechanical device is operable to decouple the operative connection between the manual control device and the actuator with the absence of power supplied to the electromechanical device. The electromechanical device can recouple the operative connection between the manual control device and the actuator on resupply of power to the electromechanical device and on manually achieving proper rotational alignment or indexing between the manual control device and the actuator.

BACKGROUND

A control system of an aircraft includes manual controls such as manually manipulated control sticks and foot pedals. The manual manipulation of the control sticks and the foot pedals by a pilot controls the flight of the aircraft.

In some aircraft, the manual manipulation of the control sticks and foot pedals is assisted by a series of actuators. The actuators are operatively connected between the control sticks and foot pedals of the aircraft and the flight control surfaces of the aircraft, such as rotor blades, ailerons, trim tabs, etc. The actuators operate the flight control surfaces of the aircraft in response to manual manipulation of the control sticks and the foot pedals. Backdriving the actuator is necessary when the actuator is not operating.

At times during flight, when the actuator is not operating, a particular maneuver of the aircraft will cause inertia forces from the actuators to the control stick and foot pedals. At times, the inertia forces translated back to the control sticks and food pedals are too great for the pilot to backdrive the actuator and could potentially lose control of the aircraft and injure the pilot.

SUMMARY

The electromechanical decoupler of this disclosure is operable to separate a pilot of an aircraft from excessive inertia forces translated back from the actuator to the manual controls of the aircraft. The electromechanical decoupler allows the pilot to maintain control of mechanical flight controls of the aircraft when an actuator of the flight controls fails, or when the actuator is in a passive mode, resulting in higher than acceptable flight control forces being translated back to the pilot.

The electromechanical decoupler includes a compact housing. The housing has a cylindrical outer wall. The cylindrical outer wall has a center axis that defines mutually perpendicular axial and radial directions relative to the housing.

A plurality of housing projections are provided on an interior surface of the outer wall. The housing projections extend radially inwardly from the interior surface of the housing wall. The projections are configured as spur gear teeth that form a ring gear on the interior surface of the outer wall.

The housing also includes a base plate that is connected to one side of the outer wall. The base plate has a center hole that extends through the base plate. The center hole is coaxial with the housing center axis.

The housing also includes an end plate that is connected to the opposite side of the outer wall from the base plate. The end plate also has a center hole through the end plate. The center hole of the end plate is coaxial with the center axis. Additionally, the center hole through the end plate is aligned with the center hole through the base plate and has the same diameter dimension as the center hole through the base plate.

A base plate bearing assembly is mounted in the center hole of the base plate and an end plate bearing assembly is mounted in the center hole of the end plate.

Three alignment pins are connected to the end plate and extend axially into the interior volume of the housing. The alignment pins are parallel and are spatially, circumferentially arranged around the center axis.

A shaft extends through the interior volume of the housing. The shaft is coaxial with the center axis. The shaft is mounted in the base plate bearing assembly and the end plate bearing assembly for rotation of the shaft in the housing. The shaft is secured against axial movement in the housing.

A plurality of narrow, elongate guides are positioned on the shaft. The guides are spatially, circumferentially arrange around the shaft. The guides have straight axial lengths that extend along a portion of the shaft length. Additionally, each of the guides has a height dimension that extends radially outward from the shaft.

A decoupler plate is mounted on the shaft. The decoupler plate has a circular configuration. A plurality of plate projections extend radially outward from an outer edge of the decoupler plate. The plate projections are complementary to the housing projections. The decoupler plate has a center hole with a plurality of axial grooves formed in the center hole. The grooves are spatially, circumferentially arranged around the center hole. The plurality of guides on the shaft engage in the plurality of grooves in the center hole of the decoupler plate securing the decoupler plate against rotation relative to the shaft, but enabling axial movement of the decoupler plate over the shaft. The decoupler plate is axially moveable on the shaft in opposite first and second axial directions between a first position of the decoupler plate relative to the shaft and a second position of the decoupler plate relative to the shaft. In the first position of the decoupler plate relative to the shaft, the plate projections of the decoupler plate are meshed with the housing projections of the housing, thereby connecting the decoupler plate to the housing, and connecting the shaft to the housing. In the second position of the decoupler plate relative to the housing, the plate projections on the decoupler plate are moved out of mesh with the housing projections of the housing, thereby disconnecting the plate from the housing and enabling the rotation of the plate together with the shaft relative to the housing. The decoupler plate is also provided with a plurality of pinholes through the decoupler plate. The pinholes are spatially, circumferentially arranged on the decoupler plate to axially align with the alignment pins on the end plate.

A coil spring is mounted on the shaft. The coil spring engages between an annular spring retainer at one end of the shaft and the decoupler plate. The spring exerts a biasing force on the decoupler plate that urges the decoupler plate in the second axial direction to the second position of the decoupler plate on the shaft.

There are five electromagnets employed in the electromechanical decoupler. Each of the electromagnets is secured to the end plate of the housing in the interior volume of the housing. The plurality of electromagnets are spatially, circumferentially arranged around the coil spring. The electromagnets are operable to create magnetic fields between the electromagnets and the decoupler plate when activated. The magnetic field created pulls the decoupler plate against the bias force of a coil spring from the second position of the decoupler plate on the shaft to the first position of the decoupler plate on the shaft. The decoupler plate is held against the electromagnets by the magnetic fields created by the activated electromagnets. In the second position of the decoupler plate relative to the shaft and the housing, the alignment pins extend through the pin holes and the plate projections mesh with the housing projections. This positioning of the decoupler plate connects the decoupler plate to the housing.

When the electromagnets are deactivated, the magnetic field between the electromagnets and the decoupler plate is extinguished. With the magnetic field extinguished, the coil spring pushes the decoupler plate in the second axial direction from the first position of the decoupler plate on the shaft, to the second position of the decoupler plate relative to the shaft. This disconnects the decoupler plate and the shaft from the housing.

Manual control devices are connected to the housing. The manual control devices are operatively connected with flight controls of an aircraft, for example the control sticks and foot pedals.

In use of the electromechanical decoupler, the electromagnets are activated creating magnetic fields between the electromagnets 132 and the decoupler plate. This draws the decoupler plate from its second position on the shaft to its first position on the shaft. If the alignment pins are not aligned with the pin holes of the decoupler plate, the manual control devices are manipulated to cause movement of the housing around the center axis until the alignment pins align with the pin holes. This movement also ensures that the manual control devices connected to the housing are properly indexed or positioned relative to the shaft. When the alignment pins align with the pin holes, the decoupler plate moves in the first axial direction on the shaft to its first position on the shaft. This causes the plate projections on the decoupler plate to mesh with the housing projections in the interior of the housing outer wall. This in turn causes the housing to be connected with the decoupler plate and the shaft. This also couples the manual control devices with the actuator. Manual manipulations of the manual control devices will cause the housing to move with the decoupler plate and the shaft, resulting in rotational movements of the shaft.

During flight operations, if it is necessary to separate the pilot from excessive inertia forces being transmitted from the actuator through the mechanical decoupler to the manual control devices, the electromagnets are deactivated. This causes the coil spring to push the decoupler plate from its first position on the shaft to its second position on the shaft. This moves the plate projections on the decoupler plate out of meshing engagement with the housing projections on the housing. This disconnects the housing from the decoupler plate and the shaft. This in turn separates the manual control devices and the pilot manipulating those devices from the excessive inertia forces being transferred from the actuator to the shaft. This also enables the pilot to control the flight control surfaces of the aircraft by manipulation of the manual control devices without the assistance of the actuator.

On cessation of the excessive inertia forces on the flight control surfaces of the aircraft, the electromagnets can again be activated. Activation of the electromagnets creates the magnetic field between the electromagnets and the decoupler plate. The magnetic field again moves the decoupler plate in the first axial direction from the second position of the decoupler plate on the shaft, to the first position of the decoupler plate on the shaft. With manual manipulation of the manual control devices, the alignment pins are aligned with the pin holes of the decoupler plate, permitting the decoupler plate to move to its first position on the shaft. This also properly indexes the manual control devices with the shaft of the actuator. With movement of the decoupler plate to its first position on the shaft, the plate projections on the decoupler plate mesh with the housing projections on the housing, thereby connecting the housing with the decoupler plate and the shaft. This also reconnects the operative connection between the manual control devices and the shaft of the actuator.

The features, functions, and advantages that have been discussed can be achieved independently in various embodiments or may be combined in yet other embodiments, other details of which can be seen with reference to the following description and drawings.

BRIEF DESCRIPTION OF THE DRAWINGS

Further features of the electromechanical decoupler are set forth in the following description of the decoupler and in the drawing figures.

DESCRIPTION

Figure 1:
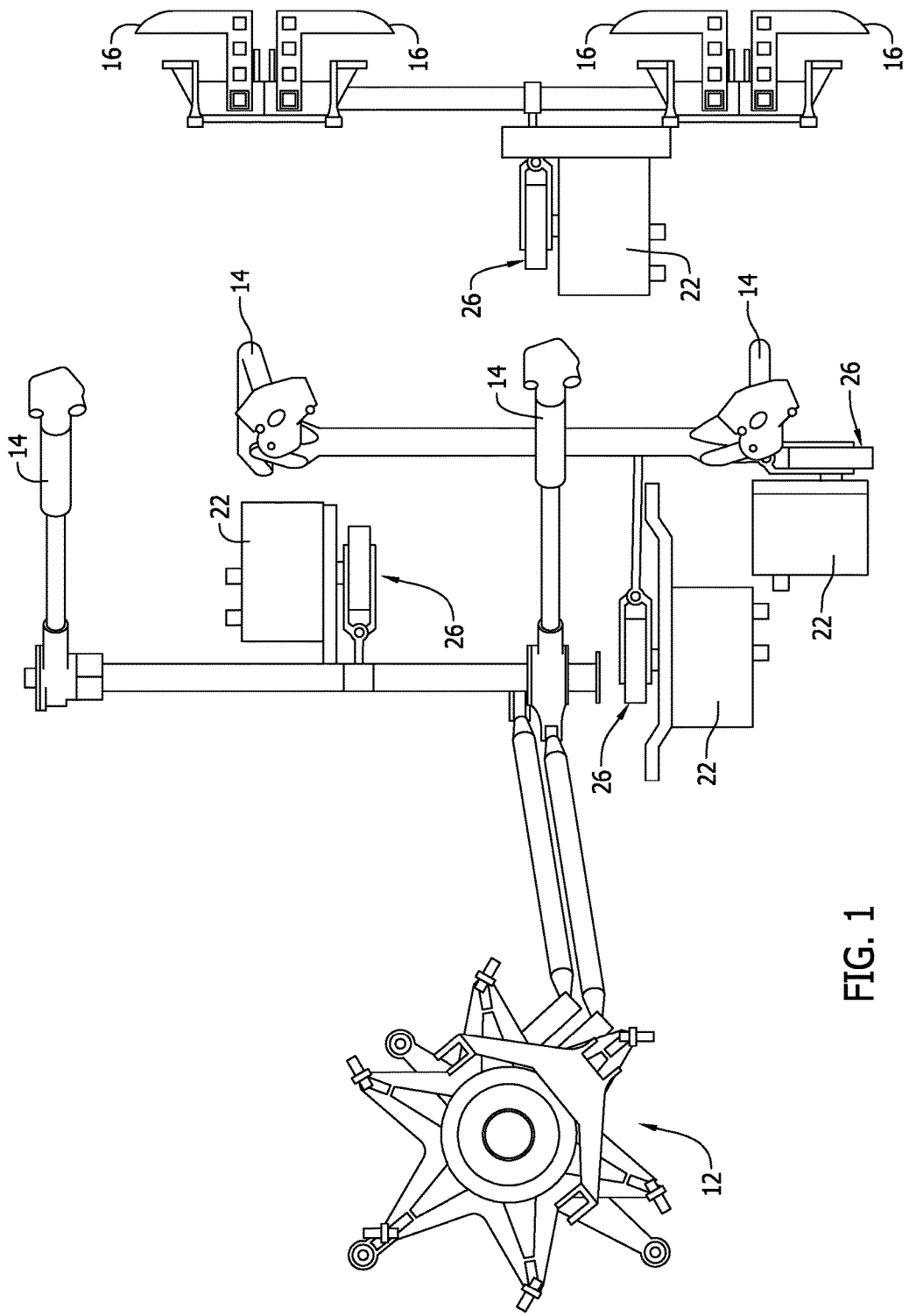
FIG. 1 is a representation of a control system for an aircraft.

FIG. 1 is a representation of a control system for an aircraft. In the representation of FIG. 1, the aircraft is a rotary-wing aircraft. A rotor 12 of the aircraft to which rotor blades (not shown) are attached is represented in FIG. 1. The rotor blades are operatively connected to a series of manual controls in the cockpit of the aircraft.

The manual controls include manually manipulated control sticks 14 and foot pedals 16. Manipulation of the control sticks 14 and foot pedals 16 controls the flight of the aircraft. The manual manipulation of the control sticks 14 and foot pedals 16 by a pilot is assisted by a series of actuators 22.

The actuators 22 are operatively connected with the control sticks 14 and foot pedals 16. The actuators operate the rotor blades of the rotor 12 as well as other flight control surfaces of the aircraft in response to manual manipulation of the control sticks 14 and the food pedals 16.

Represented in FIG. 1 are electromechanical decouplers 26 operatively connected between the actuators 22 and the control sticks 14 and food pedals 16 of the aircraft. In response to excessive inertia forces exerted on the rotor blades or other flight surfaces of the aircraft, the electromechanical decouplers 26 can be immediately actuated to separate the control sticks 14 and food pedals 16 from the actuators 22, thereby separating the pilot from the excessive inertia forces.

Figure 2:
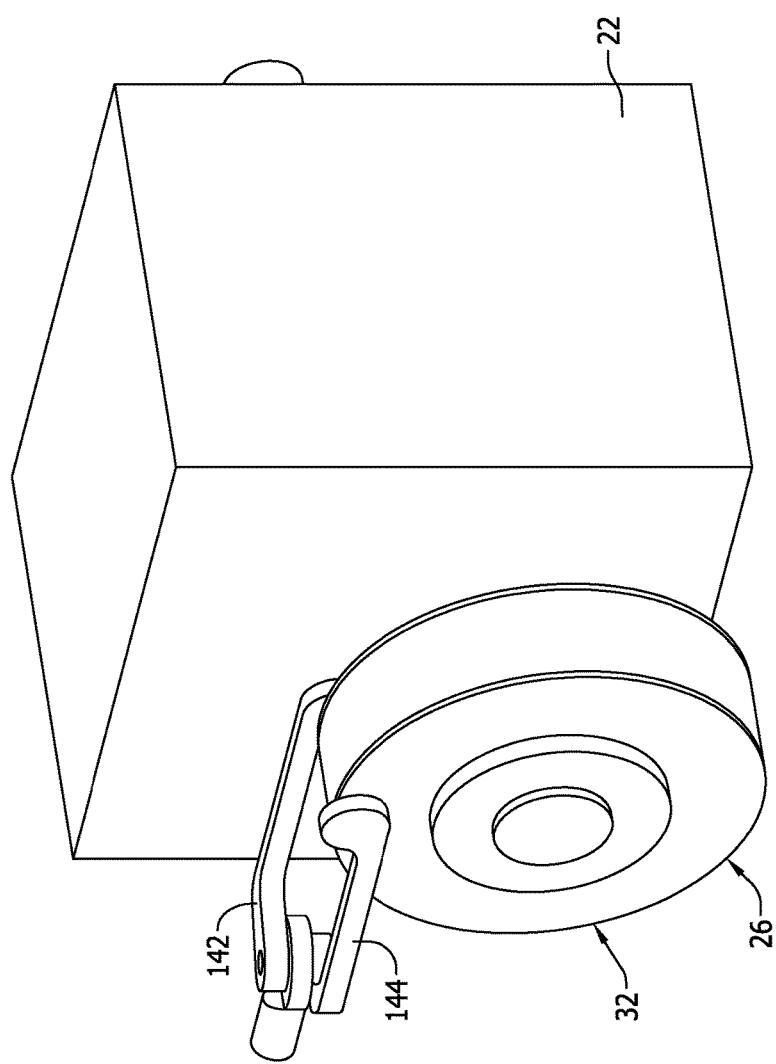
FIG. 2 is a representation of a perspective view of the electromechanical decoupler connected to an electromechanical actuator of the aircraft control system.
Figure 3:
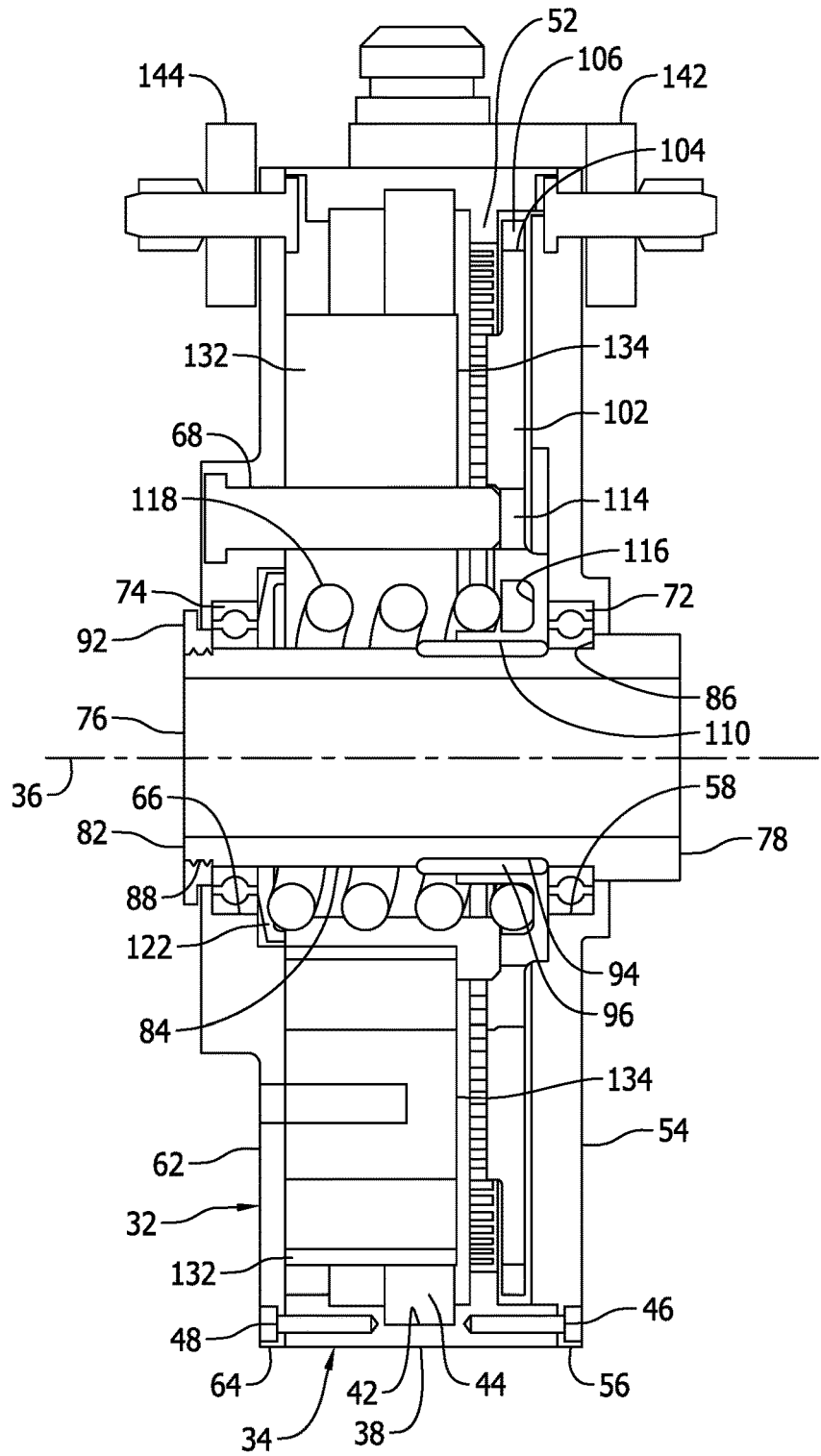
FIG. 3 is a cross-section view of the electromechanical decoupler.
Figure 4:
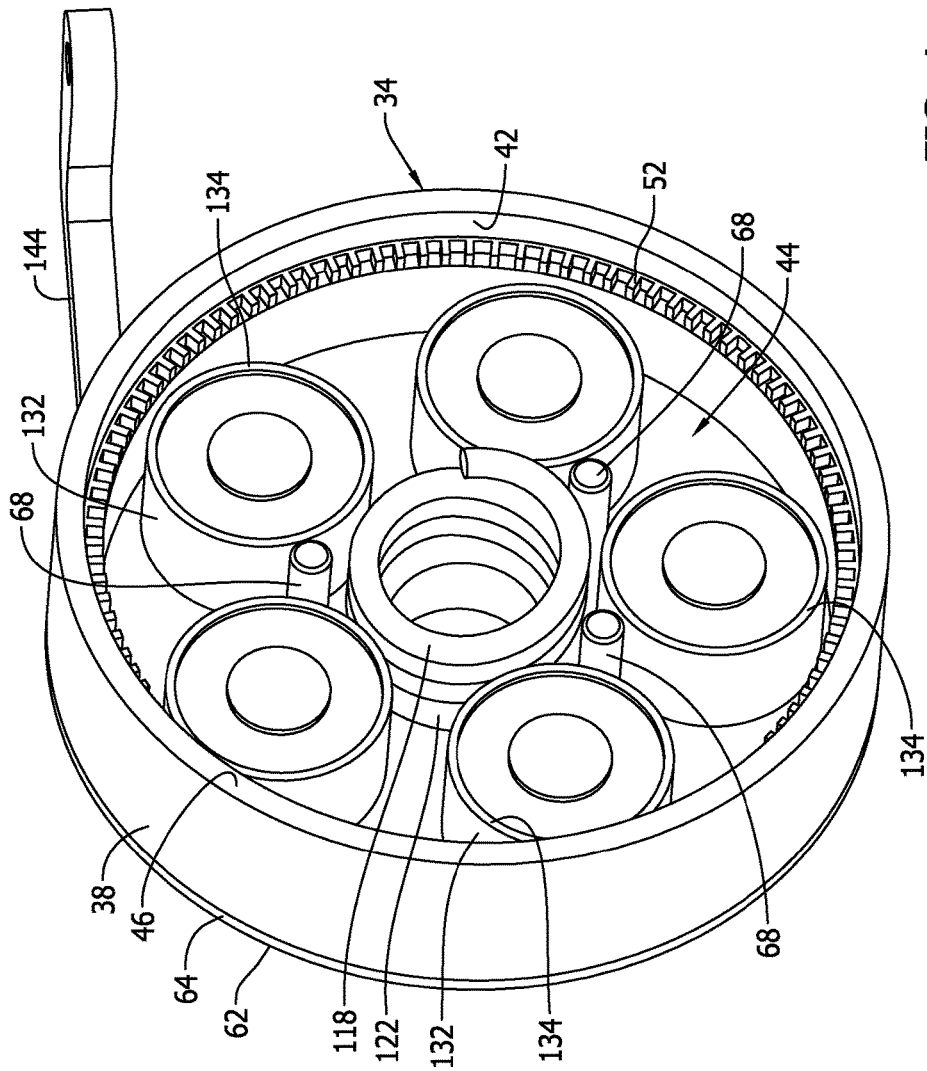
FIG. 4 is a representation of a perspective view of the left side of the interior of the decoupler shown in FIG. 3.
Figure 5:
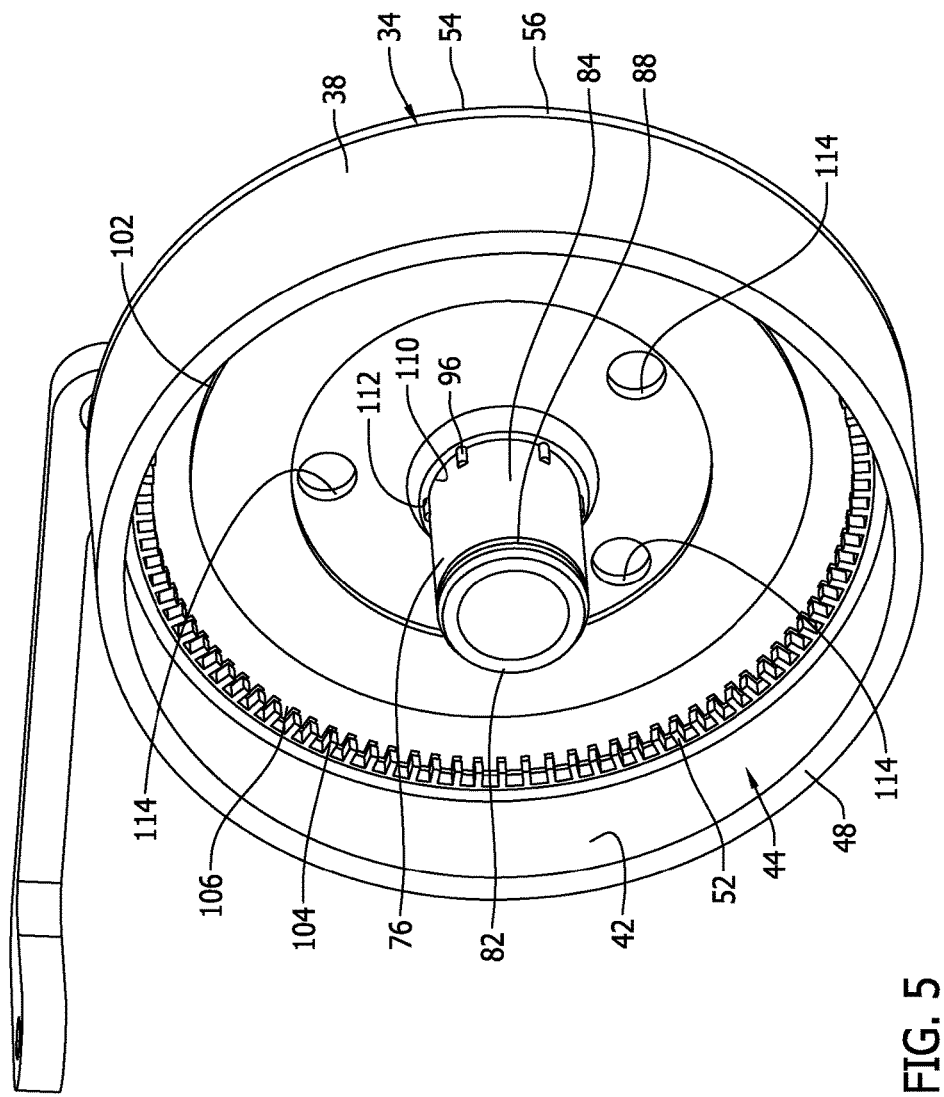
FIG. 5 is a representation of a perspective view of the right side of the interior of the decoupler as shown in FIG. 3.

FIG. 2 is a representation of a perspective view of one of the electromechanical decouplers 26 connected to an actuator 22. FIG. 3 is a cross-section view of the electromechanical decoupler 26 in its uncoupled condition. FIG. 4 is a representation of a perspective view of the left side of the interior of the decoupler as shown in FIG. 3. FIG. 5 is a representation of a perspective view of the right side of the interior of the decoupler as shown in FIG. 3.

The component parts of the decoupler 26 to be described are constructed of materials that provide the component parts with sufficient strength for the intended functioning of the decoupler. The component parts could be constructed of metal, or other equivalent materials.

The electromechanical decoupler 26 is contained inside a housing 32. The housing 32 has an outer wall 34 with a cylindrical configuration. The cylindrical configuration of the outer wall 34 has a center axis 36. The center axis 36 defines mutually perpendicular axial and radial directions relative to the housing 32. The outer wall 34 has an exterior surface 38 and a radially opposite interior surface 42. The interior surface 42 surrounds an interior volume 44 of the housing. The housing 42 has an axial length that extends from a circular base edge 46 on the right side of the outer wall 34 as viewed in FIG. 3 to a circular end edge 48 on the left side of the outer wall as viewed in FIG. 3.

A plurality of housing projections 52 are provided on the interior surface 42 of the outer wall 34. The plurality of housing projections 52 extend radially inwardly from the interior surface 42 and are arranged in a circle around the interior volume 44. The circle of the housing projections 52 is coaxial with the center axis 36. As represented in FIGS. 3 and 4, the projections 52 are configured as spur gear teeth that form a ring gear on the interior surface 42 of the housing 32. Other equivalent configurations of the housing projections 52 could be employed in the electromechanical decoupler 26.

A base plate 54 is connected to the base edge 46 of the outer wall 34. The base plate 54 is substantially flat and has a circular outer edge 56 that defines a circular configuration of the base plate 54. As represented in FIG. 3, the outer edge 56 is co-extensive with the exterior surface 38 of the housing outer wall 34. A center hole 58 extends through the base plate 54. The center hole 58 is coaxial with the housing center axis 36.

An end plate 62 is connected to the end edge 48 of the housing outer wall 34. The end plate 62 is substantially flat and has a circular outer edge 64 that defines a circular configuration of the end plate. The outer edge 64 of the end plate 62 is coextensive with the exterior surface of the housing outer wall 34. The end plate 62 has a center hole 66 through the end plate. The center hole 66 of the end plate 62 is coaxial with the center axis 36. Additionally, the center hole 66 through the end plate 62 is axially aligned with and has substantially the same diameter dimension as the center hole 58 through the base plate 54.

A plurality of alignment pins 68 are connected to the end plate 62. As represented in FIG. 3, the alignment pins 68 extend through holes in the end plate 62 and into the interior volume 44 of the housing 32. The alignment pins 68 could be attached to the end plate 62 in other equivalent manners. The alignment pins 68 are parallel and are spatially, circumferentially arranged around the center axis 36. The alignment pins 68 are also radially positioned between the center hole 66 of the end plate 62 and the outer edge 64 of the end plate. As represented in the drawing figures, there are three alignment pins 68 equally spatially arranged around the center axis 36. More or fewer than the three alignment pins 68 could be employed in the electromechanical decoupler 26.

A base plate bearing assembly 72 is mounted in the center hole 58 of the base plate 54. An end plate bearing plate assembly 74 is mounted in the center hole 66 of the end plate 62. The bearing assemblies 72, 74 represented in FIG. 3 are ball bearing assemblies. Other equivalent types of bearing assemblies could be employed in the electromechanical decoupler 26.

A shaft 76 extends through the interior volume 44 of the housing 32. The shaft 76 is coaxial with the center axis 36. The shaft 76 is mounted in the base plate bearing assembly 72 and the end plate bearing assembly 74 for rotation of the shaft 76 around the center axis 36 of the housing 32. As represented in FIG. 3, the shaft 76 extends completely through the housing 32 from a right hand end 78 of the shaft to a left hand end 82 of the shaft. The shaft 76 is represented as being hollow in FIG. 3, but the shaft could be solid. The shaft 76 has a cylindrical exterior surface 84. An annular shoulder surface 86 is formed on the shaft exterior surface 84 adjacent the right hand end 78 of the shaft. The shoulder surface 86 engages against the base plate bearing assembly 72 and holds the shaft against axial movement in the interior volume 44 of the housing 32. A screw thread 88 is formed on the exterior surface 84 of the shaft 76 adjacent the left hand end 82 of the shaft. A retainer ring 92 is threaded onto the screw thread 88 and engages against the end plate bearing assembly 74. Together the shoulder surface 86 and the retainer ring 92 securely hold the shaft 76 in its axial position relative to the housing 32. The shaft 76 also has a plurality of axial grooves 94 formed in the exterior surface 84 of the shaft. The axial grooves 94 are spatially, circumferentially arranged around the shaft 76.

Figure 6:
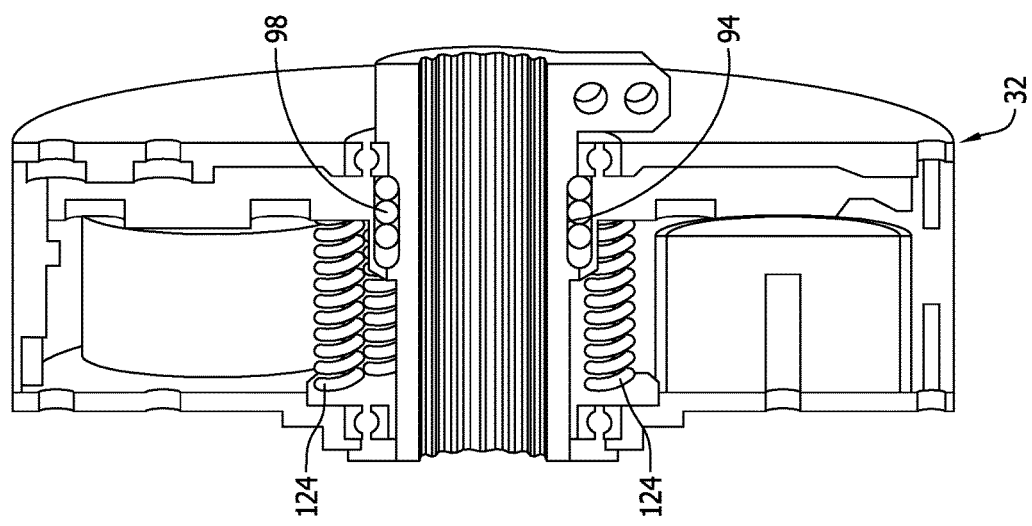
FIG. 6 is a representation of a cross-section view of a variation of the decoupler.

A plurality of narrow, elongate guides 96 are positioned in the axial grooves 94 of the shaft 76. The guides 96 each have straight axial lengths that extend across a portion of the exterior surface 84 of the shaft 76. Additionally, each of the guides 96 have height dimensions that extend radially from the axial grooves 94 and outwardly from the exterior surface 84 of the shaft 76. The positioning of the guides 96 in the shaft grooves 94 spatially, circumferentially arranges the guides 96 around the center axis 36. In the representation of the electromechanical decoupler 26 shown in FIG. 3, the guides 96 are formed as splines positioned in the axial grooves 94. Other equivalent types of guides 96 could be employed in place of the splines. For example, the splines 96 could be replaced by axial rows of ball bearings 98 as represented in FIG. 6.

A decoupler plate 102 is mounted on the shaft 76. The decoupler plate 102 is substantially flat and has a circular outer edge 104 that gives the decoupler plate 102 a circular configuration. The decoupler plate outer edge 104 is formed with a plurality of plate projections 106 that extend radially outwardly from the outer edge. The plate projections 106 are complementary to the housing projections 52. The complementary configurations of the plate projections 106 and the housing projections 52 enables the decoupler plate 102 to be positioned in the same plane as the housing projections 52.

Figure 7:
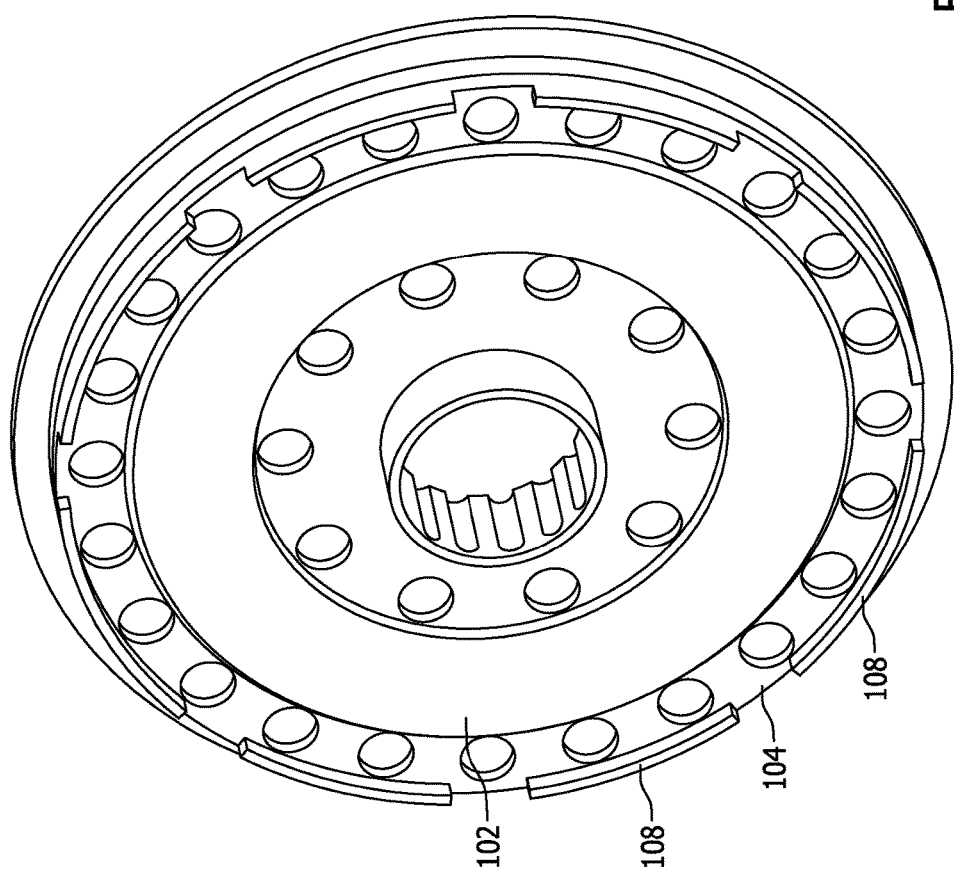
FIG. 7 is a representation of a perspective view of a variation in a component part of the decoupler.
Figure 8:
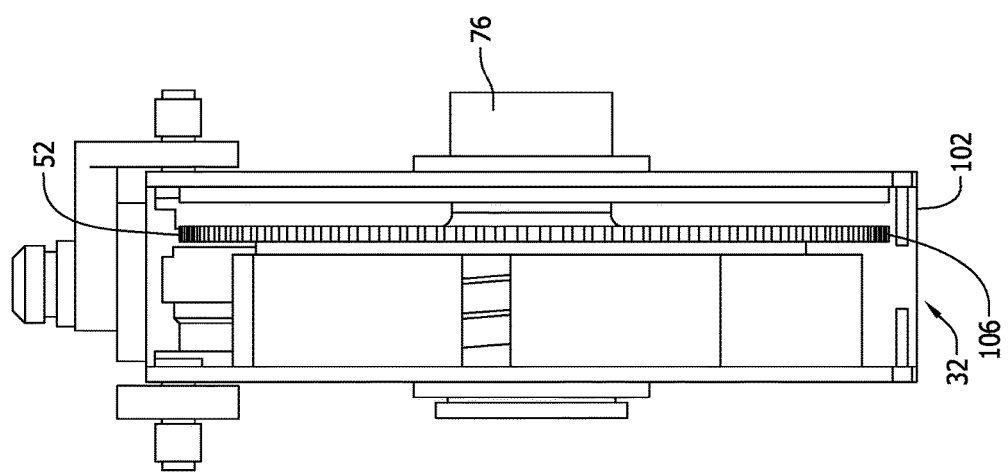
FIG. 8 is a representation of a cross-section view of the decoupler.

In the electromechanical decoupler 26 represented in FIG. 3, the plate projections 106 have the configuration of spur gear teeth. Other configurations of the plate projections 106 could also be employed in the electromechanical decoupler 26. For example, the decoupler plate could have axially projecting teeth 108 such as those represented in FIG. 7. The decoupler plate 102 has a center hole 110 that is coaxial with the center axis 36. The center hole 110 is dimensioned to receive the exterior surface 84 of the shaft 76 in the center hole. A plurality of axial grooves 112 are formed in the center hole 110 of the decoupler plate 102. The grooves 112 are spatially, circumferentially arranged around the center hole 110. The positions of the grooves 112 correspond to the positions of the guides 96 in the axial grooves 94 of the shaft 76. The engagement of the guides 96 in the grooves 112 of the center hole 110 of the decoupler plate 102 mounts the decoupler plate 102 to the shaft 76 and secures the decoupler plate 102 against rotation relative to the shaft 76, but enables axial movement of the decoupler plate 102 over the shaft 76. The decoupler plate 102 is mounted by the guides 96 to the shaft 76 for movement of the decoupler plate 102 in opposite first and second axial directions between a first position of the decoupler plate 102 relative to the housing 32 represented in FIG. 8, to a second position of the decoupler plate 102 relative to the housing 32 represented in FIG. 3. In the first position of the decoupler plate 102 relative to the housing 32, the plate projections 106 of the decoupler plate 102 are meshed with the housing projections 52 of the housing 32 as represented in FIG. 8, thereby connecting the decoupler plate 102 to the housing 32. In the second position of the decoupler plate 102 relative to the housing 32 represented in FIG. 3, the plate projections 106 on the decoupler plate 102 are moved out of mesh with the housing projections 52 of the housing 32, thereby disconnecting the decoupler plate 102 from the housing and enabling rotation of the decoupler plate 102 together with the shaft 76 relative to the housing 32. The decoupler plate 102 is also provided with a plurality of pin holes 114 through the decoupler plate. The pin holes 114 are spatially, circumferentially arranged around the center hole 110 of the decoupler plate 102. The pin holes 114 are also radially positioned on the decoupler plate 102 to axially align with the alignment pins 68 on the end plate 62. The decoupler plate 102 has a spring groove 116 radially within the pin holes 114. The spring groove 116 is annular and extends completely around the shaft 76 and the center axis 36.

Figure 9:
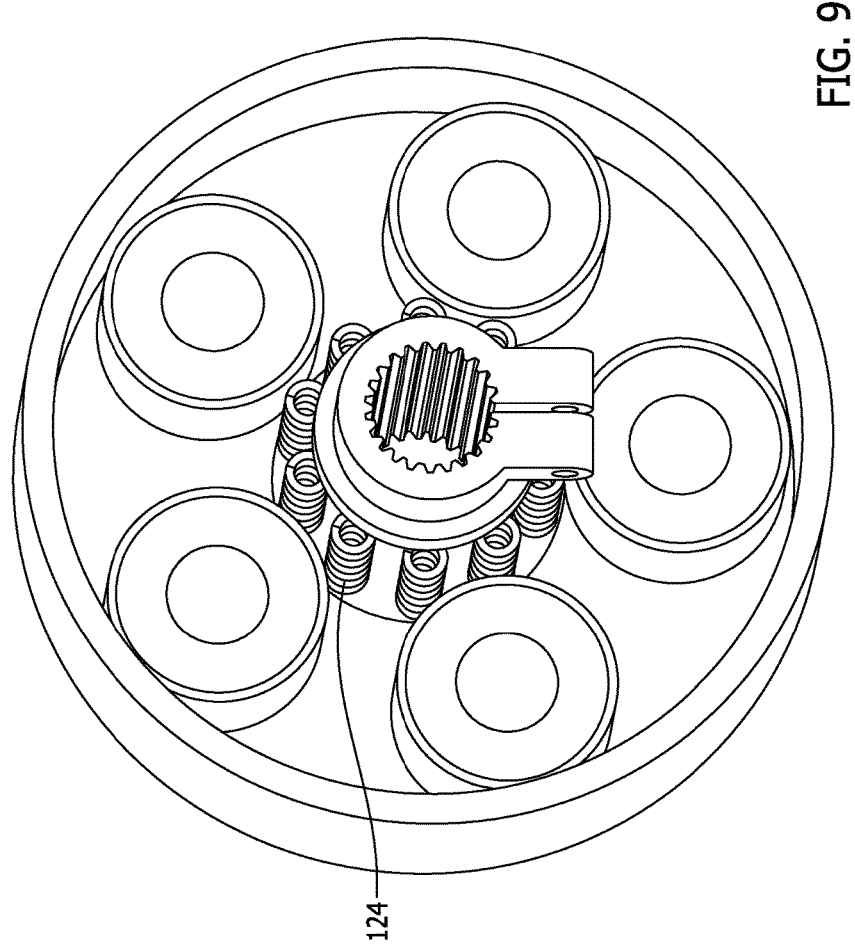
FIG. 9 is a representation of a perspective view of the left side of the interior of a variation of the decoupler.
Figure 10:
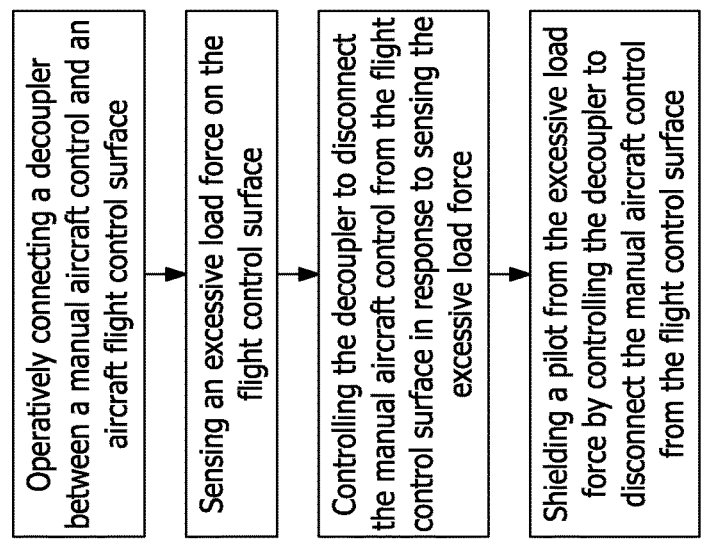
FIG. 10 is a representation of a flow chart of the method of using the electromagnetic decoupler.

A biasing device such as a coil spring 118 is mounted on the shaft 76 in the interior volume 44 of the housing 32. As represented in FIG. 3, the coil spring 118 extends between an annular spring retainer 122 that engages against the end plate bearing assembly 74, to the spring groove 116 in the decoupler plate 102. The coil spring 118 engaging between the spring retainer 122 and the spring groove 116 of the decoupler plate 102 exerts a biasing force on the decoupler plate 102 that urges the decoupler plate in the second axial direction to the second position of the decoupler plate 102 relative to the housing 32 represented in FIG. 3. Although a coil spring 118 is represented as the biasing device in FIG. 3, other equivalent types of biasing devices could be employed in the electromechanical decoupler 26 that exert a biasing force on the decoupler plate 102 and urge the decoupler plate to its second position relative to the housing 32. For example, the coil spring 118 could be replaced by a plurality of coil springs 124 spatially, circumferentially arranged around the shaft 76 as represented in FIG. 9.

A plurality of electromagnets 132 are provided in the interior volume 44 of the housing 32. Each of the electromagnets 132 is secured to the end plate 62 of the housing 32 in the interior volume 44 of the housing. As represented in FIG. 4, there are five electromagnets 132 spatially, circumferentially arranged around the coil spring 118. Other numbers of electromagnets 132 could be employed in the electromechanical decoupler 26. Each of the electromagnets 132 has a cylindrical configuration. Each of the electromagnets 132 extends from the end plate 62 axially into the housing a distance that spaces end 136 132 of the electromagnets 132 just short of the ring of housing projections 52. The electromagnets 132 are operable to create magnetic fields between the end surfaces 134 and the decoupler plate 102 when activated. The magnetic fields created pull the decoupler plate 102 against the bias force of the coil spring 118 from the second position of the decoupler plate 102 on the shaft 76 represented in FIG. 3, to the first position of the decoupler plate 102 on the shaft 76 represented in FIG. 8. As represented in FIG. 8, the decoupler plate 102 is held against the end surfaces 134 of the electromagnets 132 by the magnetic fields created by the activated electromagnets 132. In the position of the decoupler plate 102 relative to the shaft 76 and the housing 32, the alignment pins 68 extend through the pin holes 114 and the plate projections 106 mesh with the housing projections 52. This positioning of the decoupler plate 102 connects the decoupler plate to the housing 32.

When the electromagnets 132 are deactivated, the magnetic fields between the electromagnets 132 and the decoupler plate 102 are extinguished. With the magnetic fields extinguished, the coil spring 118 pushes the decoupler plate 102 in the second axial direction from the first position of the decoupler plate 102 on the shaft 76 represented in FIG. 8, to the second position of the decoupler plate 102 relative to the shaft 76 represented in FIG. 3. This disconnects the decoupler plate 102 and the shaft 76 from the housing 32.

Manual control devices 142, 144 are connected to the housing 32 as represented in FIG. 2. The manual control devices 142 are operatively connected with flight controls of an aircraft, for example the control sticks 14 and foot pedals 16 represented in FIG. 1.

According to the method of using the electromechanical decoupler 26 of this disclosure, the electromechanical decoupler 26 allows a pilot to maintain control of mechanical flight controls of a control system of an aircraft when a parallel electromechanical actuator of the control system fails, or when the electromechanical actuator when in a passive mode is back driven resulting in higher than acceptable flight control forces being transmitted by the mechanical flight controls to the pilot.

Referring to FIG. 1, a control system for an aircraft is represented. The control system employs several of the electromechanical decouplers 26 operatively connected between actuators 22 of the control system and parallel mechanical flight controls such as manually manipulated control sticks 14 and foot pedals 16. During flight of the aircraft with the actuators 22 turned on, the actuators 22 assist the pilot in the manual manipulation of the control sticks 14 and foot pedals 16 and provide the pilot with feedback on the loads exerted on the flight control surfaces of the aircraft through the control sticks 14 and foot pedal 16. The feedback is transmitted from the actuators 22 through the electromechanical decouplers 26 to the control sticks 14 and foot pedals 16.

In use of the electromechanical decouplers 26 to operatively connect the control sticks 14 and foot pedals 16 in parallel with their associated actuators 22, the electromagnets 132 are activated creating magnetic fields between the electromagnets 132 and the decoupler plate 102. This draws the decoupler plate 102 from its second position on the shaft 76 represented in FIG. 3, to its first position on the shaft 76 represented in FIG. 8. If the alignment pins 68 are not aligned with the pin holes 114 of the decoupler plate 102, the manual control devices 142, 144 are manipulated by manually manipulating the control sticks 14 and foot pedals 16 to cause movement of the housing 32 around the center axis 36 until the alignment pins 68 align with the pin holes 114. This movement also ensures that the manual control devices 142, 144 connected to the housing 32 are properly indexed or positioned relative to the shaft 76. When the alignment pins 68 align with the pin holes 114, the decoupler plate 102 moves in the first axial direction on the shaft 76 to its first position on the shaft represented in FIG. 8. This causes the plate projections 106 on the decoupler plate 102 to mesh with the housing projections 52 in the interior of the housing outer wall 34. This in turn causes the housing 32 to be connected with the decoupler plate 102 and the shaft 76. This also couples the manual control devices 142, 144 with the actuator 22. In this manner, each of the control sticks 14 and foot pedals 16 of the aircraft control system represented in FIG. 1 is operatively connected through an electromechanical decoupler 26 with its associated actuator 22 movements of the control sticks 14 and foot pedals 16 are transmitted through their associated manual control devices 142, 144 and cause the housing 32 connected to the control devices 142, 144 to move with the decoupler plate 102 and the shaft 76, resulting in rotational movements of the shaft 76.

According to the method of using the electromagnetic decouplers 26 of this disclosure, the decouplers 26 allow the pilot to maintain control of the mechanical flight controls such as the control sticks 14 and foot pedals 16 when a parallel actuator 22 fails or when excessive forces on the flight control surfaces of the aircraft backdrive the actuator 22 in a passive mode resulting in higher than acceptable flight control forces being transmitted to the pilot. During flight operations, if it is necessary to separate the pilot from excessive inertia forces being transmitted from an actuator 22 through the electromechanical decoupler 26 to the manual control devices 142, 144 and their associated control sticks 14 or foot pedals 16 to the pilot of the aircraft, the electromagnets 132 are deactivated. The deactivation of the electromagnets 132 could be in response to a signal generated by a sensor associated with the actuator 22 that senses an excessive back driving force transmitted from a flight control surface of the aircraft to the actuator 22. The deactivation of the electromagnets 132 causes the coil spring 118 to push the decoupler plate 102 from its first position on the shaft 76 represented in FIG. 8, to its second position on the shaft 76 represented in FIG. 3. This moves the plate projections 106 on the decoupler plate 102 out of meshing engagement with the housing projections 52 on the housing 32. This disconnects the housing 32 from the decoupler plate 102 and the shaft 76. This in turn separates the manual control devices 142, 144 and their associated control sticks 14 and foot pedals 16 and the pilot manipulating those devices from the excessive inertia forces being transferred from the actuator 22 to the shaft 76. This also enables the pilot to control the flight control surfaces of the aircraft by manipulation of the manual control sticks 14 and foot pedals 16 and their associated control devices 142, 144 without the assistance of the actuator 22.

On cessation of the excessive inertia forces on the flight control surfaces of the aircraft, the electromagnets 132 can again be activated. Activation of the electromagnets 132 creates the magnetic fields between the electromagnets 132 and the decoupler plate 102. The magnetic fields again move the decoupler plate 102 in the first axial direction from the second position of the decoupler plate 102 on the shaft 76 represented in FIG. 3, to the first position of the decoupler plate 102 on the shaft 76 represented in FIG. 8. With manual manipulation of the manual control devices 142, 144, the alignment pins 68 are aligned with the pin holes 114 of the decoupler plate 102, permitting the decoupler plate 102 to move to its first position on the shaft 76. This also properly indexes the manual control devices 142, 144 with the shaft 76 of the actuator 22. With movement of the decoupler plate 102 to its first position on the shaft 76, the plate projections 106 on the decoupler plate 102 mesh with the housing projections 52 on the housing 32, thereby connecting the housing 32 with the decoupler plate 102 and the shaft 76. This also reconnects the operative connection between the manual control devices 142, 144 and the shaft 76 of the actuator 22.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. An electromechanical decoupler comprising:
   a housing, the housing enclosing an interior volume of the housing;
   a shaft extending through the interior volume, the shaft having a center axis of rotation that defines mutually perpendicular axial and radial directions relative to the housing, the shaft being rotatable around the center axis relative to the housing;
   a decoupler plate in the interior volume, the decoupler plate being connected to the shaft for rotation of the decoupler plate with rotation of the shaft, the decoupler plate being moveable on the shaft in a first axial direction to a first position of the decoupler plate relative to the housing and in an opposite second axial direction to a second position of the decoupler plate relative to the housing, the decoupler plate having a plurality of plate projections on the decoupler plate, the plurality of plate protections extending radially outward from the decoupler plate;
   a biasing device in the interior volume, the biasing device being operable to exert a biasing force on the decoupler plate, the biasing force urging the decoupler plate to move in the second axial direction to the second position of the decoupler plate;
   a plurality of housing projections in the interior volume, the plurality of housing projections being connected to the housing, the plurality of housing projections extending radially inward, the plurality of housing projections being configured to engage with the plurality of plate projections when the decoupler plate is in the first position of the decoupler plate relative to the housing, the plurality of housing projections engaging with the plurality of plate projections connecting the housing to the decoupler plate for rotation of the housing together with the decoupler plate around the center axis and the plurality of housing projections disengaging from the plate projections when the decoupler plate is in the second position of the decoupler plate relative to the housing enabling the housing and the decoupler plate to rotate independently around the center axis; and, an electromagnet in the interior volume, the electromagnet being operable to create a magnetic field when the electromagnet is activated, the magnetic field pulling the decoupler plate in the first axial direction against the biasing force to the first position of the decoupler plate relative to the housing, and the electromagnet being operable to extinguish the magnetic field when the electromagnet is deactivated allowing the biasing device to push the decoupler plate in the second axial direction to the second position of the decoupler plate relative to the housing and causing the housing projections to disengage from the plate projections.

2. The electromechanical decoupler of claim 1, further comprising:
a manual control device operatively connected to the housing, the manual control device being manually operable to rotate the housing around the center axis in response to manual movements of the manual control device.

3. The electromechanical decoupler of claim 1, further comprising:
the housing having an outer wall, the outer wall having a cylindrical configuration that surrounds the interior volume;
the housing having a base plate, the base plate having a circular configuration, the base plate being on one side of the outer wall; and,
the housing having an end plate, the end plate having a circular configuration, the end plate being on an opposite side of the outer wall from the base plate; and,
the outer wall, the base plate and the end plate together enclosing the interior volume.

4. The electromechanical decoupler of claim 1, further comprising;
a plurality of guides on the shaft, the plurality of guides extending radially outward from the shaft, the plurality of guides extending axially along the shaft, and the plurality of guides engaging with the decoupler plate and connecting the decoupler plate to the shaft for rotation of the decoupler plate with the shaft around the center axis and the plurality of guides connecting the decoupler plate to the shaft for axial movement of the decoupler plate on the shaft.

5. The electromechanical decoupler of claim 4, further comprising:
the plurality of guides on the shaft being a plurality of splines, each spline of the plurality of splines has an axial length that extends axially along the shaft and a radial height that extends radially from the shaft.

6. The electromechanical decoupler of claim 4, further comprising:
the plurality of guides on the shaft being a plurality of ball bearings arranged in axial lines on the shaft, the axial lines of the plurality of ball bearings being spatially, circumferentially arranged around the shaft.

7. The electromechanical decoupler of claim 1, further comprising:
the plurality of plate projections on the decoupler plate being spur gear teeth that extend around an outer periphery of the decoupler plate; and,
the plurality of housing projections on the housing being spur gear teeth arranged around a cylindrical interior surface of the housing.

8. The electromechanical decoupler of claim 1, further comprising:
the electromagnet being one of a plurality of electromagnets in the interior volume, the plurality of electromagnets being spatially, circumferentially arranged around the center axis.

9. The electromechanical decoupler of claim 1, further comprising:
the biasing device being a coil spring in the interior volume, the coil spring being coiled around the shaft and around the center axis.

10. The electromechanical decoupler of claim 1, further comprising:
the biasing device being a plurality of coil springs in the interior volume, the plurality of coil springs being spatially, circumferentially arranged around the shaft and around the center axis.

11. An electromechanical decoupler comprising:
a housing, the housing enclosing an interior volume of the housing;
a shaft extending through the interior volume, the shaft having a center axis of rotation that defines mutually perpendicular axial and radial directions relative to the housing, the shaft being rotatable around the center axis relative to the housing;
a decoupler plate in the interior volume, the decoupler plate being connected to the shaft for rotation of the decoupler plate with rotation of the shaft, the decoupler plate being moveable on the shaft in a first axial direction to a first position of the decoupler plate on the shaft and in an opposition second axial direction to a second position of the decoupler plate on the shaft, the decoupler plate having a pin hole through the decoupler plate;
a biasing device in the interior volume, the biasing device being operable to exert a biasing force on the decoupler plate, the biasing force urging the decoupler plate in the second axial direction to the second position of the decoupler plate on the shaft;
an alignment pin in the interior volume, the alignment pin being connected to the housing at a position where the alignment pin moves into the pin hole in the decoupler plate and connects the housing to the decoupler plate when the decoupler plate is moved from the second position to the first position on the shaft; and,
an electromagnet in the interior volume, the electromagnet being operable to create a magnetic field when the electromagnet is activated, the magnetic field pulling the decoupler plate in the first axial direction against the biasing force of the biasing device from the second position of the decoupler plate on the shaft to the first position of the decoupler plate on the shaft where the alignment pin moves into the pin hole in the decoupler plate and connects the housing to the decoupler plate and the shaft, the electromagnet being operable to extinguish the magnetic field when the electromagnet is deactivated allowing the biasing device to push the decoupler plate in the second axial direction to the second position of the decoupler plate on the shaft where the housing and the decoupler plate are not connected.

12. The electromechanical decoupler of claim 11, further comprising:
a manual control device operatively connected to the housing, the manual control device being manually operable to rotate the housing around the center axis in response to manual movements of the manual control device.

13. The electromechanical decoupler of claim 11, further comprising:
the housing having an outer wall, the outer wall having a cylindrical configuration that surrounds the interior volume;
the housing having a base plate, the base plate having a circular configuration, the base plate being on one side of the outer wall; and,
the housing having an end plate, the end plate having a circular configuration, the end plate being on an opposite side of the outer wall from the base plate; and,
the outer wall, the base plate and the end plate together enclosing the interior volume.

14. The electromechanical decoupler of claim 11, further comprising:
a plurality of guides on the shaft, the plurality of guides extending radially outward from the shaft, the plurality of guides extending axially along the shaft, and the plurality of guides engaging with the decoupler plate and connecting the decoupler plate to the shaft for rotation of the decoupler plate with the shaft around the center axis and for axial movement of the decoupler plate on the shaft.

15. The electromechanical decoupler of claim 14, further comprising:
the plurality of guides on the shaft being a plurality of splines, each spline of the plurality of splines has an axial length that extends axially along the shaft and a radial height that extends radially from the shaft.

16. The electromechanical decoupler of claim 14, further comprising:
the plurality of guides on the shaft being a plurality of ball bearings arranged in axial lines on the shaft, the axial lines of the plurality of ball bearings being spatially, circumferentially arranged around the shaft.

17. The electromechanical decoupler of claim 11, further comprising:
the pin hole through the decoupler plate being one pin hole of a plurality of pin holes through the decoupler plate, the plurality of pin holes being spatially, circumferentially arranged around the center axis; and,
the alignment pin being one of a plurality of alignment pins in the interior volume, the plurality of alignment pins being spatially, circumferentially arranged around the center axis.

18. A method of shielding a pilot from excessive load forces exerted on a flight control surface of an aircraft, the method comprising:
operatively connecting a decoupler between a manual control of a control system of the aircraft and the flight control surface; and,
controlling the decoupler to disconnect the manual control of the control system of the aircraft from the flight control surface in response to an excessive load force exerted on the flight control surface.

19. The method of claim 18, further comprising:
activating an electromagnet of the decoupler to operatively connect the manual control of the control system of the aircraft and the flight control surface; and,
deactivating the electromagnet of the decoupler to disconnect the manual control of the control system of the aircraft and the flight control surface.

20. The method of claim 18, further comprising:
activating a plurality of electromagnets of the decoupler to operatively connect the manual control of the control system of the aircraft and the flight control surface; and,
deactivating the plurality of electromagnets of the decoupler to disconnect the manual control of the control system of the aircraft and the flight control surface.

* * * * *